United States Patent [19]

Sheu et al.

[11] Patent Number: 4,698,232

[45] Date of Patent: Oct. 6, 1987

[54] SOFT-TEXTURED CONFECTIONER COMPOSITION CONTAINING FIBER

[75] Inventors: Shan-Shan Sheu, Parsippany; Robert K. Yang, Randolph; Vincent Corsello, Cedar Knolls, all of N.J.

[73] Assignee: Warner-Lambert Company, Morris Plains, N.J.

[21] Appl. No.: 875,429

[22] Filed: Jun. 17, 1986

[51] Int. Cl.$^4$ .................. A23L 1/308; A23L 1/307; A23G 3/00

[52] U.S. Cl. .................. 426/572; 426/660; 426/804; 426/548; 426/331; 426/575; 426/103

[58] Field of Search .............. 426/103, 572, 575, 660, 426/804, 548, 331

[56] References Cited

U.S. PATENT DOCUMENTS

| | | | |
|---|---|---|---|
| 3,809,756 | 5/1974 | Bush et al. | 426/572 |
| 3,814,819 | 6/1974 | Morgan | 426/103 |
| 3,998,976 | 12/1976 | Pernod et al. | 426/572 |
| 4,089,981 | 5/1978 | Richardson | 426/804 |
| 4,152,462 | 5/1979 | Hayward | 426/103 |
| 4,251,561 | 2/1981 | Gajewski | 426/572 |
| 4,451,488 | 5/1984 | Cook et al. | 426/103 |
| 4,543,262 | 9/1985 | Michowski | 426/103 |
| 4,605,561 | 8/1986 | Lang | 426/103 |

FOREIGN PATENT DOCUMENTS 055432  7/1982  European Pat. Off. ............ 426/103

*Primary Examiner*—Jeanette Hunter
*Attorney, Agent, or Firm*—Daniel A. Scola, Jr.; Gary M. Nath

[57] ABSTRACT

A fiber-containing confectionery composition which is soft in texture and smooth in mouthfeel comprising dietary fiber pretreated with a lubricant, a foamed matrix portion comprising gelatin, gum arabic and non-sucrose liquid sweetener and an amorphous matrix portion comprising a non-sucrose syrup having a solids content of about 92 to about 96% by weight of the syrup.

18 Claims, No Drawings

SOFT-TEXTURED CONFECTIONER COMPOSITION CONTAINING FIBER

BACKGROUND OF THE INVENTION

This invention relates to a fiber-containing confectionery composition which is soft in texture and smooth in mouthfeel. The products of this invention have a consistency which can be described as having the textural characteristics commonly associated with chewy gels or short nougats, yet having a high fiber content which is not organoleptically perceptable.

Numerous fiber-containing products are available in the market in the form of breakfast cereals, laxative beverages, bran tablets and cereal bars. Snack meals consisting of granola-type bars and cookies have become increasingly popular as a substitute for traditional meals. The awareness of the health benefits of fiber has been largely responsible for this popularity. Yet many fiber markets have experienced a consumer reluctance to eat sufficient amounts of fiber to experience the therapeutic benefits associated with fiber. This reluctance is usually due to the objectionable taste of the fiber, or the high calories associated with masking the objectionable taste. The dry, unpalatable texture and mouthfeel of fiber requires the incorporation of fats and carbohydrates (masking agents) in amounts which effectively dilute the fiber dosage per unit of product. Commercially available confectionery products containing fiber are generally of the granola-type. Chocolate, fruits and nuts are often added to other confectionery ingredients to enhance the palatability of the final product.

The instant invention focuses on a unique confectionery form for delivering fiber. Rather than the standard granola-type formulations, the instant invention attempts to use elements of nougat technology and boiled candy technology, as well as coating technology to achieve a composition and final product which have about 20 to about 30% dietary fiber present.

SUMMARY OF THE INVENTION

The instant invention concerns a fiber-containing confectionery composition having a soft non-fibrous texture comprising:

(a) a pre-treated fiber composite comprising dietary fiber powder coated with a lubricant material selected from the group consisting of fats and glycerin.

(b) a foamed matrix portion comprising gelatin, gum arabic and a non-sucrose liquid sweetener capable of providing bulk and structure to the foamed matrix; and (c) an amorphous matrix portion comprising a non-sucrose syrup having a solids content of about 92 to about 96% by weight of the syrup.

DETAILED DESCRIPTION AND PREFERRED EMBODIMENTS

Fiber Composite

The fiber composite is present in the composition in amounts of about 25 to about 45% by weight of the total composition and preferably in amounts of about 30 to about 40% by weight. The fiber used in the composite is preferably from a food source which is rich in dietary fiber content, although dietary fiber may be extracted from foods and used directly in the composite, such as described in U.S. Pat. No. 4,565,702, wherein soluble dietary fiber is first extracted and purified (concentrated) from a food source and then used to coat insoluble dietary fiber.

Both soluble and insoluble fibers are useful. For purposes of this invention "soluble fiber" shall mean water soluble, dispersible or swellable fiber, and "insoluble fiber" shall mean water insoluble, substantially non-swellable fiber. Examples of useful soluble fibers include the film-forming hydrocolloid materials selected from the group consisting of seaweed extracts, tree exudates, seed gums and mixtures thereof. Particular hydrocolloids include guar gum, locust, bean gum, pectin, psyllium seed husk, alginates and mixtures thereof.

Useful fiber sources include grains, seeds and fruits (e.g., fruit pulp). In particular, cereal brans such as corn, wheat, oats, rye and barley bran are preferred. These brans are known to be high in insoluble dietary fiber, which is generally comprised of cellulose, hemicellulose and lignin.

The fiber composite is formed by pre-treating the fiber particles with a coating of a fat and glycerin mixture. Coating of the fiber particles is accomplished using conventional blending techniques and is carried out prior to combining the fiber composite with the foamed and amorphous matrices. The fat and glycerin work in combination to provide a lubricating and taste-masking effect on the fibrous or dry texture that would otherwise be objectionable. The groups of fats which are useful are quite broad. Animal fats, including butter and milk fats, and vegetable fats may be used in the coating. Vegetable fats are, however, preferred and those intended for use include hydrogenated, partially hydrogenated and fractionated vegetable oils. Specific examples of vegetable oils are partially hydrogenated palm kernel oil, fractionated palm kernel oil, palm oil, coconut oil, cottonseed oil, safflower oil, sunflower oil, corn oil, soy oil and mixtures thereof. The fat content is about 10 to about 30% by weight of the fiber composite and preferably about 15 to 25% by weight.

Glycerin is present in the coating in amounts of about 5 to about 15% by weight and preferably about 8 to about 10% by weight of the fiber composite. In addition to glycerin, mono-and diglyceride emulsifiers may be employed in amounts of about 1 to about 10% by weight of the fiber composite to prevent fat separation.

A variety of drugs and medicaments can be added along with or in place of the fiber particles providing there is proper taste-masking of these materials. Thus, the inventive compositions can serve as delivery systems for any number of actives.

Foamed Matrix

The foamed matrix portion is similar in appearance and physical characteristics to the conventional frappe. It differs however in its composition and choice of whipping agents. Whereas the prior art focused on the use of egg albumen, corn syrup, water and sugar as frappe components, the foamed matrix of the present invention eliminates sucrose and egg albumen and requires the incorporation of gelatin and gum arabic as whipping agents. In forming the foamed matrix, corn syrup, preferably of the high fructose variety, is admixed with a gelatin/gum arabic agueous mixture. This mixture is whipped in a blender at a temperature of about 55° to about 65° C. until a foamed matrix is obtained having a density of about 0.3 to about 0.5 g/cm$^3$ is obtained. The density range of the matrix is very narrow and outside of these ranges, e.g., less than about 0.3 g/cm$^3$ results in a product which is too soft; or in the case of a density which is greater than about 0.5 g/cm$^3$, results in a product which is difficult to mix and form, as well as being too hard to easily chew. The matrix may also include other additives such as colorants, flavorings and medicaments.

The foamed matrix contains gelatin in the amount of about 1 to about 8% by weight of the final composition and preferably about 3% to about 5%.

The final fiber-containing confectionery product incorporates the foamed matrix portion in amounts of about 10 to about 15% by weight of the final product.

Amorphous Matrix

The final necessary component of the inventive composition is the amorphous matrix, present in the final product in amounts of about 40 to about 60% by weight and preferably in amounts of about 45 to about 50%. This matrix comprises a mixture of corn syrup and high fructose corn syrup mixture in a ratio of about 4:1 to about 1:4. While this mixture is similar to what is commonly termed "bob syrup," it differs in at least two aspects from conventional bob syrups. First, the matrix is devoid of sucrose which is normally a part of bob syrup. Second, the addition of seed particles is not required for thickening, since the fiber added in the composite form acts like a seed to build up structure and develop the appropriate texture for a syrup. The amorphous matrix is cooked at about 125° to about 140° C. until the desired solids content is obtained. A solids content of about 92 to about 96% is required. The amount of corn syrup present in the final confectionery product is generally about 40% to about 60% by weight of the final product, and preferably 40% to about 45%.

Other sweeteners as an alternative for or in addition to corn syrup may be employed. For example, hydrogenated starch hydrolysate, polydextrose, invert sugar or honey may be employed.

In forming the compositions of this invention, the amorphous matrix is added to the foamed matrix and mixed to obtain homogeneity. The desired quantity of fiber composite is then mixed in to obtain a particular texture and fiber content, and the composition is then poured into molds or extruded, shaped, cut and packaged. The products of this invention do not require special hermetic packaging to prevent staling, and remain soft and chewy after long periods of time in open air.

The inventive compositions have a variety of uses including for healthy snacks, therapeutic products for laxative, diet control, cholesterol control and the like.

The products formed from the instant compositions reasonable a short nougat-like texture, rather than the stringy consistency of taffy or a chewy nougat. The composition is easily formed into any number of shapes, sizes and dosage forms, e.g., bars, tablets, chunks etc. The amount of fiber present in any one piece will depend on the intended use. For example, a snack food product may contain less fiber than a laxative or diet control product. In any case, regardless of the fiber content, the total composition must be adjusted to maintain the proper short nougat-like texture and the foamed and amorphous matrices must be adjusted accordingly.

The shortness or chewiness of a batch is controlled by several factors. One factor is the percentage of sweetener, such as corn syrup, invert sugar or honey present. Another factor is the mixing method employed in manufacture. Shortness does not necessarily require a large percentage of non-crystalline sweetener to form the grain in the batch. In fact, too much crystalline structure often causes the nougat to become crumbly.

The compositions of the instant invention may contain a variety of conventional confectionery ingredients such as flavorings, colorings, auxiliary, sweeteners. accidulents, lubricants, binders, fillers, emulsifiers, oils and other taste and textural modifiers. Suitable flavorings include both natural and artificial flavors, and mints such as peppermint. menthol, artificial vanilla, cinnamon, various fruit flavors and the like, as well as mixtures thereof, are contemplated. The flavorings are generally utilized in amounts that will vary depending upon the individual flavor, and may, for example, range in amounts of about 0 3 to about 2% by weight and preferably about 0.4 to about 1.8% by weight based on the total weight of the final composition. The amount of flavoring agent utilized is not critical and is a matter of preference. Similarily, where dry fruit is used as the flavor source the amount used as a matter of preference and can vary from about 5% to about 20% by weight and preferably about 8% to about 15% weight of the total food product. It is within the scope of this invention to utilize natural fruits and fruit extracts in combination with flavoring agents. Examples of dried fruits useful include, but are not limited to, apples. apricots, peaches, bananas, pineapples, oranges, grapefruits, prunes, raisins and the like.

In the instance where auxiliary sweeteners are utilized, the present invention contemplates the inclusion of those sweeteners well known in the art, including both natural and artificial sweeteners. Thus, additional sweeteners may be chosen from the following nonlimiting list: sugars such as glucose (corn syrup), dextrose, invert sugar, honey, fructose, and mixtures thereof; saccharine and its various salts such as the sodium or calcium salt; cyclamic acid and its various salts such as the sodium salt; the dipeptide sweeteners such as aspartame; dihydrochalcone; glycyrrhizin; *Stevia rebaudiana* (Stevioside); and sugar alcohols such as sorbitol, sorbitol syrup, mannitol, xylitol, and the like. Also contemplated as additional sweeteners is the nonfermentable sugar substitute (hydrogenated starch hydrolysate) which is described in U.S. Reissue Pat. No. 26,959 and the synthetic sweetener 3.6-dihydro-6-methyl1-1-1,2,3 oxathiazin-4-one-2,2-dioxide particularly the potassium (Acesulfame-K), sodium and calcium salts thereof as described in German Pat. No. 2,001,017.7.

The following examples serve to provide further appreciation of the invention but are not meant in any way to restrict the effective scope of the invention. All percentages throughout the specification are by weight % of the final composition unless otherwise indicated.

EXAMPLES I–V

Compositions A–E represent embodiments of the invention, using various types and combinations of fiber.

| INGREDIENT % BY WEIGHT OF THE TOTAL COMPOSITION | INVENTIVE COMPOSITION | | | | |
|---|---|---|---|---|---|
| | A | B | C | D | E |
| High Fructose Corn Syrup 55 | 9.25 | 9.54 | 9.25 | 9.25 | 9.25 |
| Gum Arabic | 0.35 | 0.36 | 0.35 | 0.35 | 0.35 |
| Dextrin K 4484 | 0.17 | 0.18 | 0.17 | 0.17 | 0.17 |
| Gelatin 250 Bloom | 0.48 | 0.50 | 0.48 | 0.48 | 0.48 |
| Corn Syrup, Regular* | 21.26 | 21.90 | 21.26 | 21.26 | 21.26 |
| High Fructose Corn | 21.26 | 21.90 | 21.26 | 21.26 | 21.26 |

-continued

| INGREDIENT % BY WEIGHT OF THE TOTAL COMPOSITION | INVENTIVE COMPOSITION | | | | |
|---|---|---|---|---|---|
| | A | B | C | D | E |
| Syrup 42* | | | | | |
| Glycerine Anhydrous | 3.32 | 1.66 | 3.32 | 3.32 | 3.32 |
| Palm Kernel Oil | 8.62 | 8.62 | 8.62 | 8.62 | 8.62 |
| Malic Acid | 0.30 | — | — | — | 0.30 |
| Apple Flavor | 0.20 | — | — | — | 0.20 |
| Honey Flavor | — | 0.50 | 0.50 | 0.50 | — |
| Water** | 1.62 | 1.67 | 1.62 | 1.62 | 1.62 |
| Apple Fiber*** | 16.58 | — | — | — | 6.63 |
| Guar Gum*** | 16.58 | 16.58 | — | 16.58 | 9.95 |
| Oat Bran Fiber*** | — | 16.58 | 16.58 | — | 6.63 |
| Corn Bran Fiber*** | — | — | 16.58 | 16.58 | 9.95 |

*Cooked to 135° C., weight loss approximately 18%.
**Total Water is 7.4 ± 0.1% by weight.
***Fiber source used to form the composite.

Each of the above examples were prepared in the following manner. The fiber particles for each of the different fiber sources were coated with a mixture glycerin and palm kernel oil by conventional mixing techniques. Separately, a foamed matrix was prepared by combining the gum arabic and gelatin in aqueous solution and whipping it with the sweetener (high fructose corn syrup 55) to obtain an aerated, foamed matrix. Also separately, an amorphous mixture was prepared by mixing a 1:1 weight ratio of regular corn syrup with high fructose corn syrup 42 and cooking it to about 135° C. to obtain a solids content of about 94% by weight.

The amorphous matrix was poured into the foamed matrix and blended with a flat beater until homogenous. The temperature of this mixture was allowed to cool to about 80° to about 100° C. The fiber composite previously prepared was then added and the entire mixture was blended at low speed at first, then at medium speed to obtain homogeneity. The final composition is allowed to cool and set prior to extrusion, or simply poured into molds and allowed to set. The composition can then be formed into any desired shape and wrapped for marketing.

The invention being thus described, it will be obvious that the same may be varied in many ways. Such variations are not to be regarded as a departure from the spirit and scope of the invention and all such modifications are intended to be included within the scope of the following claims.

We claim:
1. A fiber-containing confectionery composition having a soft, non-fibrous texture comprising:
   (a) a pre-treated fiber composite present in amounts of about 25 to about 45% by weight of the total composition, said composite comprising dietary fiber powder coated with a lubricant material selected from the group consisting of fats and glycerin;
   (b) a foamed matrix portion having a density of about 0.3 to about 0.5 g/cm³ comprising gelatin, gum arabic and non-sucrose liquid sweetener capable of providing bulk and structure to the foamed matrix; and
   (c) an amorphous matrix portion present in amounts of about 40 to about 60% by weight of the total composition, comprising a non-sucrose-containing corn syrup having a solids content of about 92 to about 96% by weight of the syrup.

2. The composition of claim 1 wherein the fiber composite comprises dietary fiber is derived from a cereal bran.
3. The composition of claim 2 wherein the cereal bran is selected from the group consisting of corn, wheat, barley, rye, oats and mixture thereof.
4. The composition of claim 1 wherein the dietary fiber is derived from a hydrocolloid selected from the group consisting of gums, alginates, pectin, mucillages and mixtures thereof.
5. The composition of claim 1 wherein the dietary fiber is derived from a material selected from the group consisting of seeds, seed husks, fruit pulp and mixtures thereof.
6. The composition of claim 1 wherein the lubricant material is a mixture of partially hydrogenated vegetable oil and glycerin in amounts of about 5 to about 25% and about 5 to about 15% respectively by weight of the fiber.
7. The composition of claim 1 wherein the pretreated fiber composite is present in amounts of about 30 to 40% by weight of the final product.
8. The composition of claim 1 wherein the foamed matrix portion is present in amounts of about 10 to about 15% by weight of the final product.
9. The composition of claim 1 wherein the sweetener is selected from the group consisting of fructose, xylose, ribose, gluctose, mannose, glucose, corn syrup, hydrogenated starch hydrolysate, sugar alcohols and mixtures thereof.
10. The composition of claim 9 wherein there is additionally added a sweetener selected from the group consisting of saccharin salts, cyclamate salts, acesulfame salts, dipeptide based sweeteners, talin, monellin, dihydrochalcone and mixtures thereof.
11. The composition of claim 1 wherein the fat is selected from the group consisting of hydrogenated, fractionated or partially hydrogenated vegetable oil, animal fats, butter, and mixtures thereof.
12. A confectionery fiber-bar product comprising:
   (a) about 25 to about 45% by weight of the total composition dietary fiber derived from the group consisting of cereal bran, hydrocolloid gums, fruit pulp, and mixtures thereof, said fiber having a lubricative coating consisting essentially of vegetable fats and glycerin;
   (b) a foamed matrix portion present in amounts of about 10 to about 15% by weight of the total composition containing gelatin, gum arabic, and a liquid non-sucrose sweetener;
   (c) a non-sucrose-containing corn syrup portion having a solids content of about 92 to about 96% by weight of the syrup.
13. The product of claim 11 wherein the bulk density of the foamed matrix portion is about 0.3 to about 0.5 g/cm³.
14. The product of claim 11 having about 20 to about 30% dietary fiber, about 10 to about 15% of the frappe portion and about 40 to about 60% of the syrup portion.
15. A process for preparing a fiber-containing confectionery composition having a soft non-fibrous texture comprising:
   (a) coating fiber particles with a lubricating material selected from the group consisting of glycerin and fats;
   (b) preparing a foamed matrix having a density of about 0.3 to about 0.5 g/cm³ said matrix comprising gum arabic, gelatin and a non-sucrose sweetener;

(c) preparing an amorphous matrix comprising a non-sucrose containing corn syrup having a solids content of about 92 to about 96% by weight of the syrup;
(d) blending the foamed matrix of (b) with the amorphous matrix of (c);
(e) blending the coated fiber particles of (a) with the blend of (d).

16. The process of claim 15 wherein the water activity of the foamed matrix portion is kept to about 0.7 or less.

17. The process of claim 15 wherein the gelatin and gum arabic are whipped at a temperature of about 55° to 65° C.

18. The process of claim 15 wherein the syrup portion is prepared by cooking the syrup at about 125° to 140° C.

* * * * *